United States Patent [19]

Nagati

[11] 4,428,564
[45] Jan. 31, 1984

[54] METALLURGICAL VESSEL

[75] Inventor: Rashed N. Nagati, Mars, Pa.

[73] Assignee: Pennsylvania Engineering Corporation, Pittsburgh, Pa.

[21] Appl. No.: 342,895

[22] Filed: Jan. 26, 1982

[51] Int. Cl.³ .............................................. C21C 5/50
[52] U.S. Cl. ..................................... 266/246; 266/218
[58] Field of Search ................................ 266/218, 246

[56] References Cited

U.S. PATENT DOCUMENTS

| | | | |
|---|---|---|---|
| 4,195,985 | 4/1980 | Brotzman | 75/60 |
| 4,198,230 | 4/1980 | Brotzman | 75/60 |
| 4,369,060 | 1/1983 | Metz | 266/218 |

Primary Examiner—Peter D. Rosenberg
Attorney, Agent, or Firm—Fred Wiviott

[57] ABSTRACT

A metallurgical vessel includes a plurality of tuyeres for respectively delivering process materials to molten metal contained within the vessel. A first plurality of axial passages are provided in at least one vessel trunnion pin for conducting fluids to and from the vessel and a second plurality of radial passages are also formed in the trunnion pin and each respectively intersects one of the axial passages. An adapter sealingly engages the outer end of each radial passage and is retained in position by a common cover plate. The outer end of each adapter extends through the cover plate and is constructed and arranged for being coupled to one end of a conduit, the other end of which is connected to one of said tuyeres.

5 Claims, 6 Drawing Figures

METALLURGICAL VESSEL

BACKGROUND OF THE INVENTION

This invention relates to metallurgical vessels and more particularly to a converter vessel having a plurality of tuyeres each connected for receiving various process materials.

One type of metallurgical vessel for converting pig iron to steel, called a Q-BOP, includes one or more two-pipe tuyeres which extend through the refractory lining in the lower end of the vessel for delivering oxygen to molten ferrous metal contained therein. In order to prevent the rapid deterioration of the tuyeres and the surrounding refractory, a hydrocarbon fluid, such as propane, natural gas, coal gas or light oil is injected through the gap between the inner and outer concentric tuyere pipes to provide a protective sheath in surrounding relation to the oxygen stream.

Q-BOP vessel bottom tuyeres are also used for preheating the metallic charge which may contain solid material, such as scrap metal, sponge iron, prereduced iron pellets. When the tuyeres are used for normal oxygen blowing, the ratio of hydrocarbon to oxygen is relatively small and, accordingly, the gap between the inner and outer tuyere pipes is correspondingly small in relation to the area of the center pipe through which the oxygen is delivered. This limits the volume of fuel that can be delivered during preheating. As a result, heavier hydrocarbons, such as oil, or powdered carbon are used as a preheating fuel even though a gas is normally employed during the main oxygen blow.

It will also be appreciated that because the vessel pivots, it is necessary to deliver the required gases, liquids and particulate material from fixed to rotary piping. Normally, cooling water and the hydrocarbons are delivered in separate flow paths through a first trunnion pin and oxygen is delivered through the other pin to prevent accidental mixing of oxygen with any of the process fluids. It is also desirable in such vessels to individually control various gases, liquids and fluid entrained solids for delivery to the vessel during various portions of the operating cycle. This requires a multiplicity of individual pipes connected to flow passges in the trunnion pins and between the trunnion pins and the tuyeres.

SUMMARY OF THE INVENTION

It is a primary object of the invention to provide new and improved means for delivering process fluids in separate flow paths to the tuyeres of a pivotable metallurgical vessel.

A more specific object of the invention is to provide an adapter assembly for coupling separate flow paths formed in the trunnion pin of the metallurgical vessel to the vessel tuyeres.

These and other objects and advantages of the present invention will become more apparent from the detailed description thereof taken with the accompanying drawings.

In general terms the invention comprises a metallurgical vessel having bottom tuyeres for delivering fluids beneath the level of molten metal within the vessel and trunnion pins for tilting the vessel about a generally horizontal axis. At least one of the trunnion pins has a hollow bore for receiving a block therein. A first plurality of passages are formed generally axially in the block and a second plurality of passages are formed therein and extend laterally of the first passages. Each passage of the second plurality intersects a different one of the axial passages of the first plurality. An adapter assembly is provided for coupling a pipe to each passage of the second plurality of passages so that each of these passages can be coupled to an individual tuyere. The adapter assembly includes a plurality of adapter members each having a head portion sealingly engaging the block in communication with a different one of the passages of the second plurality of passages. A retainer is provided for securing each of said adapters in its respective second passage, and means are provided for coupling a pipe to a different one of said adapters.

DETAILED DESCRIPTION OF THE PREFERRED EMBODIMENT

Figure 1:
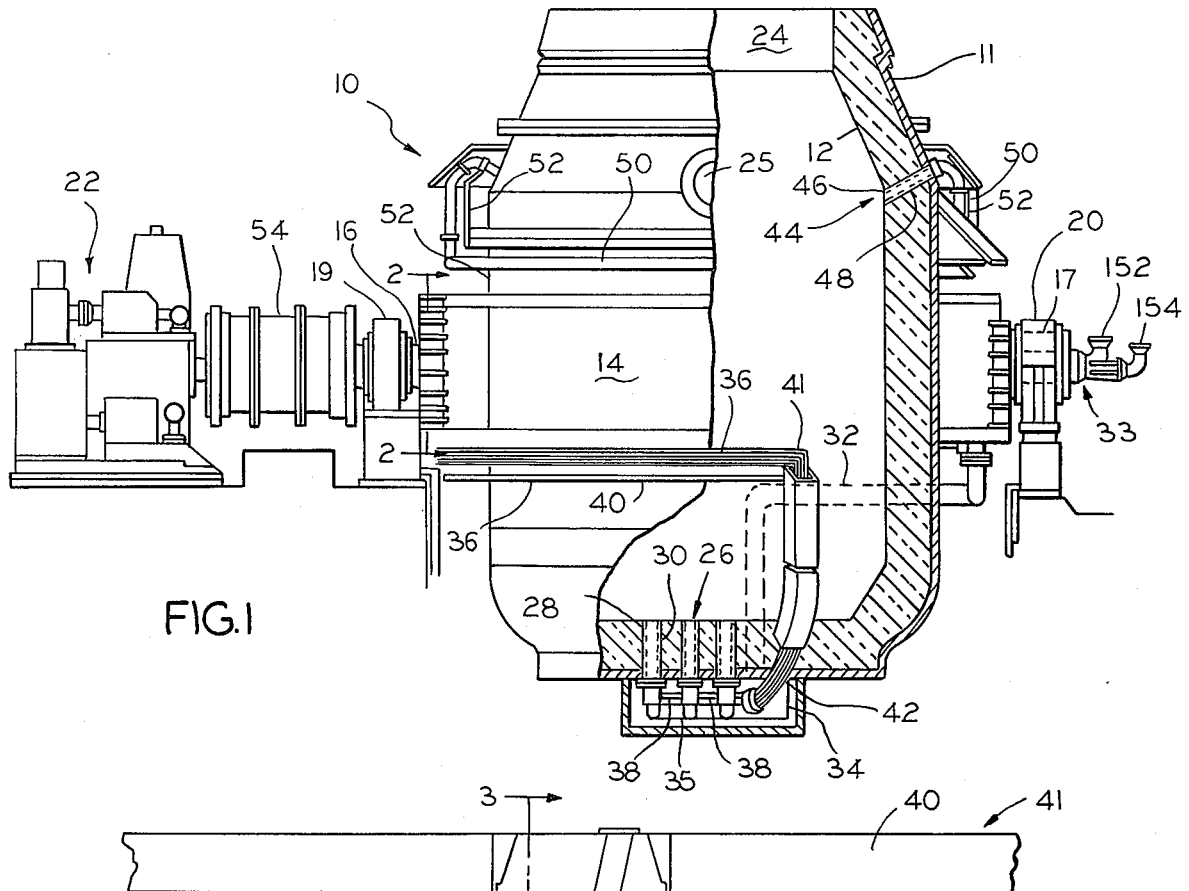
FIG. 1 is a side elevational view, with parts broken away, of a metallurgical vessel according to the present invention.

FIG. 1 shows a metallurgical vessel 10 with which the adapter assembly of the present invention may be employed. The vessel 10 is generally pear-shaped and includes a metallic shell 11 and a refractory lining 12. Support for the vessel is provided by a trunnion ring 14 having trunnion pins 16 and 17 extending from diametrically opposite sides. A trunnion ring 14 may be hollow for being cooled by water supplied in a manner described below. Trunnion pins 16 and 17 are respectively supported for pivotal movement in a generally horizontal axis by suitable bearings 19 and 20. A conventional drive assembly 22 is coupled to trunnion pin 16 for tilting the vessel to permit the charging of hot metal and/or scrap through the vessel's open upper end 24 or for discharging metal from pouring spout 25 whch opens into one side of the vessel between the trunnion ring 14 and the upper end 24.

A plurality of tuyeres 26 extend vertically through the refractory 12 at the lower end of the vessel. The details of the tuyeres 26 are not shown in detail but are a type well known for use in the Q-BOP process. In particular, tuyeres 26 include concentric spaced apart pipes 28 and 30 wherein the center pipe 28 defines a first flow pah and the gap between the pipes 28 and 30 defines a second flow path. As those skilled in the art will appreciate, oxygen is delivered through the center pipe 28 during the main oxygen blow for oxidizing carbon and other substances within the metallic charge whereby pig iron may be converted to steel. In order to minimize erosion of the tuyeres 26 and the surrounding refractory 11, hydrocarbon fluid, such as propane, natural gas, coal gas, or light oil, is injected through the gap between the inner pipe 28 and the outer pipe 30 and in surrounding relation to the oxygen. Because the volume of hydrocarbon shielding fluid is relatively small in comparison with the oxygen being delivered, the gap between the inner and outer pipes is relatively small in area when compared to that of the center pipe 28.

Oxygen is delivered to the center tuyere pipe 28 by a conduit 32 which is connected at its upper end to a first rotary joint 33 affixed to trunnion pin 17. From rotary joint 33, pipe 32 extends downwardly and then horizontally around one side of the vessel 10 where its lower end is connected to a distributor 34 mounted on the bottom of the vessel. From distributor 34, oxygen is conducted to each of the center tuyere pipes 28 by means of individual conduits 35.

Figure 2:
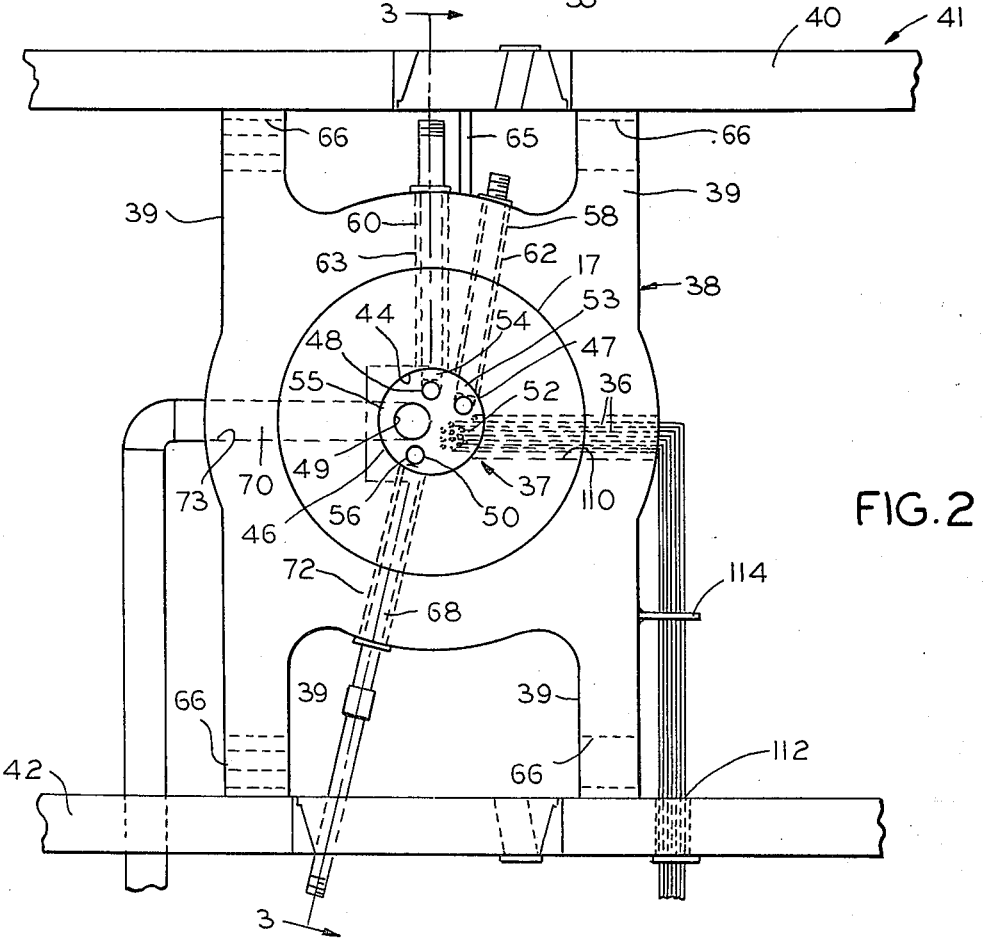
FIG. 2 is an enlarged sectional view taken along lines 2—2 of FIG. 1.
Figure 4:
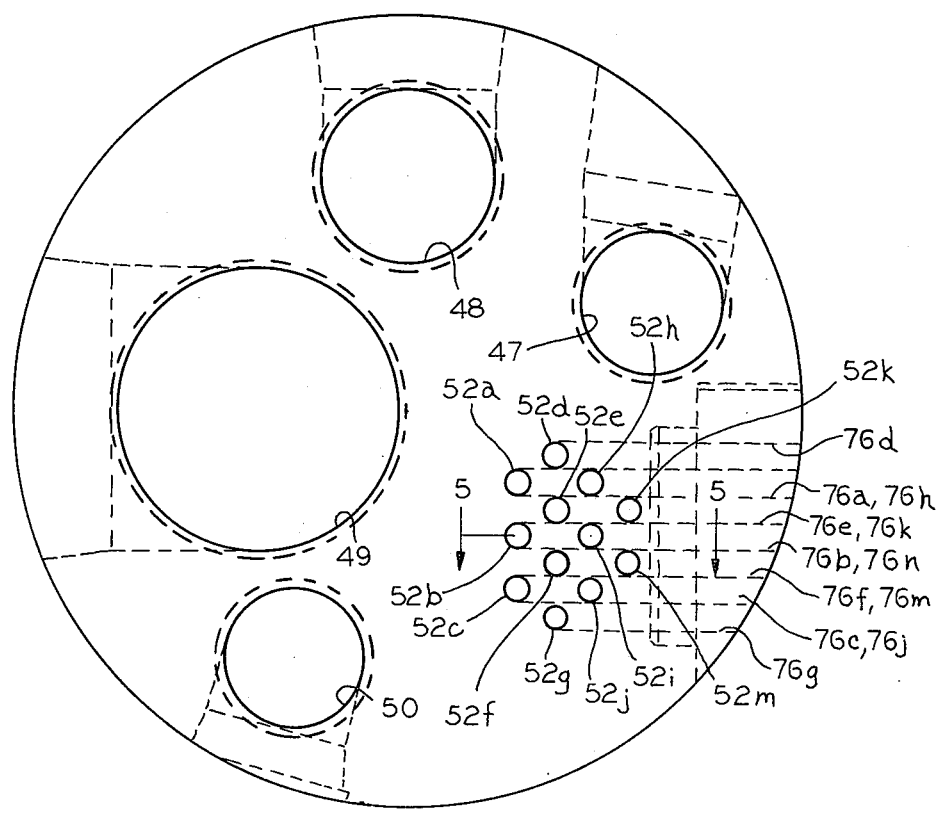
FIG. 4 is a view taken along lines 4—4 of FIG. 3.

Hydrocarbon shielding fluid is delivered to the gap between tuyere pipes 28 and 30 by means of a plurality of conduits 36 connected at one end to an adapter assembly 37 coupled to the trunnion pin 16 (FIGS. 2 and 4).

Figure 3:
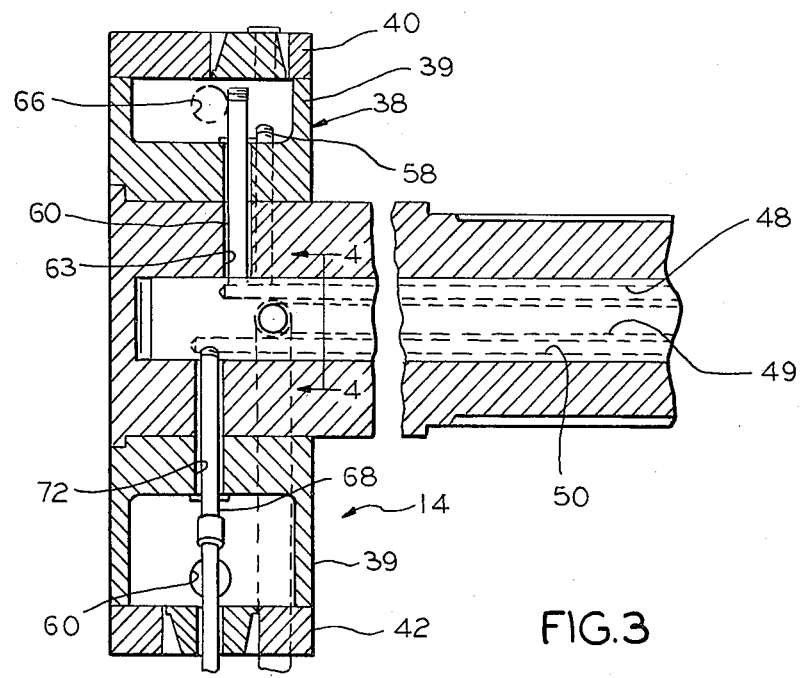
FIG. 3 is a view taken along lines 3—3 of FIG. 2.

As seen in FIGS. 2 and 3 the trunnion pin 17 is secured to the center of a generally H-shaped bracket member 38 whose legs 39 are respectively affixed to the upper and lower flanges 40 and 42 or the trunnion ring 14. A cylindrical bore 44 is formed in the trunnion pin 17 for receiving a cylindrical block 46. A first plurality of relatively large bores 47, 48, 49 and 50 and a second plurality of relatively small bores 52 are formed axially in block 46. Each of the bores 47, 48, 49, 50 and 52 are coupled at their outer ends to a suitable rotary joint 54 (see FIG. 1). While the rotary joint 37 is not shown in detail, it may, for example, be of the type shown in application Ser. No. 131,255, filed Mar. 17, 1980, now U.S. Pat. No. 4,284,266, and assigned to the assignee of the present application.

The bores 47 and 48 are respectively coupled for delivery and withdrawal of cooling water from the vessel; bores 49 and 50 are respectively coupled for delivering powdered graphite or coal entrained in nitrogen gas and fuel oil to the tuyeres 26; and bores 52 are individually coupled for delivery of hydrocarbon shielding fluid to the individual ones of the tuyeres 26. More particularly, a plurality of transverse threaded openings 53, 54, 55 and 56 are formed in the block 46 and respectively intersect bores 47, 48, 49 and 50. A first pair of pipes 58 and 60 are respectively threaded at one end into openings 53 and 54 and extend through aligned passages 62 and 63 in the bracket 38 where their opposite ends terminate in the open area between the upper legs 39 of bracket 38 and on the opposite sides of a separator 65. Cooling water may thus be delivered by pipe 58 to the hollow interior of the trunnion ring 14 for passage through openings 66 formed in bracket 38 and passage around the trunnion ring for withdrawal through pipes 63.

Pipes 68 and 70 are similarly threaded at one end into openings 55 and 56 and extend through passages 72 and 73 in bracket 39. The opposite end of pipe 68 is connected to a valve assembly (not shown) for connection to individual tuyeres while the opposite end of pipe 70 is coupled to a particle distributor which is also connected to the individual tuyere assemblies.

Figure 5:
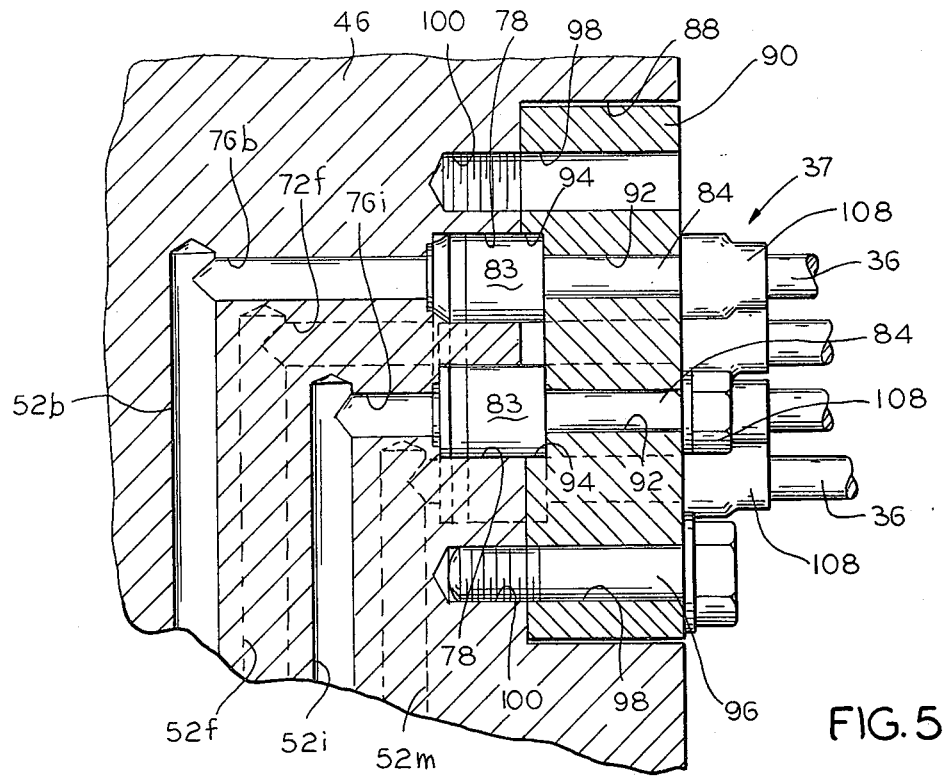
FIG. 5 is a view taken along lines 5—5 of FIG. 4.
Figure 6:
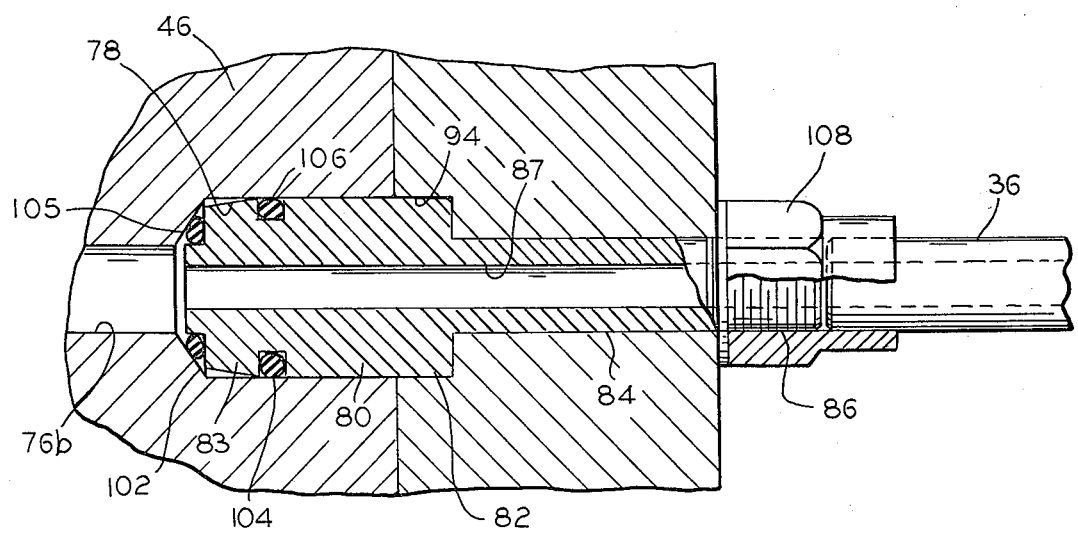
FIG. 6 is an enlarged sectional view of one of the adapters shown in FIG. 5.

Each of the small bores 52 are further identified in FIGS. 4 and 5 by reference numerals 52a, 52b, 52c, 52d, 52e, 52f, 52g, 52h, 52i, 52j, 52k and 52m. Intersecting each bore 52a–52m adjacent its terminal end is a radial passage 76a–76m, respectively, each of which has a counter sunk hole 78 at its outer end. Disposed in each of said counter sunk holes is an adapter 80 of the adapter assembly 37. Each adapter 80 is shown more particularly in FIG. 6 to include an enlarged cylindrical head portion 82 which is complimentary to the counter sunk hole 78 and a reduced diameter stem 84 extending from the head 82 and having threads 86 at its outer end 84. In addition, an axial bore 87 extends the full length of adapter 80.

A recess 88 is formed in block 46 in surrounding relation to the adapters 80 for receiving a cover plate 90 having a plurality of spaced part holes 92 for passage of the stems 84. The inner end of each hole 92 is also countersunk at 94 for receiving the heads 83 of the adapters 80. Plate 90 is secured to block 46 by bolts 96 which extend through openings 98 in plate 90 and are received in threaded holes 100 in block 46.

The head 83 of each adapter 80 has a first annular groove 102 concentrically formed in its forward end and a second concentric annular groove 104 for respectively receiving o-ring seals 105 and 106. The length of the head 83 in relation to the height of the two countersunk holes 78 and 94 is such that when the bolts 97 are tightened, the o-ring seal 105 will be comprised to seal the bore 81 relative to the passage 76b. Each individual tube 36 is affixed by a nut 108 to its associated adapter.

Each of the pipes 36 pass through a radial opening 110 in trunnion pin 17 and then downwardly through an opening 112 in flange 42 of trunnion ring 14. Suitable supports 114 are provided on member 38 for supporting pipes 36.

The fluid transport assembly of the invention permits the passage of a plurality of individual conduits through the trunnion ring and for connecting the same individually to the vessels respective bottom tuyeres. This manner, the process gas or entrained solids deliver to each of the bottom tuyeres can be individually adjusted and controlled.

While only a single embodiment of the invention has been illustrated and described, it is not intended to be limited thereby but only by the scope of the appendant claims.

I claim:

1. A metallurgical vessel having bottom tuyeres for delivering fluids beneath the level of molten metal within the vessel and trunnion pins for tilting the vessel about a generally horizontal axis, at least one of said trunnion pins having a hollow bore, body means disposed within said bore, a first plurality of passages formed generally axially of said body means and a second plurality of passages formed in said body means and extending laterally of said first passages, each passage of said second plurality intersecting a different one of the axial passages of said first plurality, an adapter assembly for coupling a pipe to each passage of said second plurality of passages so that each of said passages can be coupled to an individual tuyere, said adapter assembly including a plurality of adapter members, each adapter member having a head portion sealingly engaging said body means in communication with a different one of the passages of said second plurality of passages, retainer means for securing each of said adapters in communication with its respective second passage, and means for coupling a pipe to each of said adapters.

2. The vessel set forth in claim 1 wherein each of said adapters includes an enlarged head portion and a shank portion, an axial bore extending through each said adapter and communicating with one passage of said second plurality, said retainer means comprising a plate having a plurality of spaced apart apertures, each of said apertures receiving one of the shank portions of an adapter therethrough and engaging the heads of said adapters, and means for securing said retainer means to said body means for forcing each adapter into sealing engagement with its said body means.

3. The vessel set forth in claim 2 and including a third plurality of passages formed axially in said body means, a fourth plurality of passages formed laterally in said body means and each intersecting one passage of said third plurality of passages and pipe means coupled to each of the fourth plurality of passages for delivering fluids to said vessel.

4. The vessel set forth in claim 3 wherein each of said first plurality of axial passages is relatively small in cross-sectional area relative to the passages of said third plurality of axial passages.

5. A metallurgical vessel having bottom tuyeres for delivering fluids beneath the level of molten metal within the vessel and trunnion pins for tilting the vessel about a generally horizontal axis,
- one of said trunnion pins having a hollow bore, a body means disposed within said bore,
- a first plurality of passages formed in said body means generally parallel to said one trunnion pin,
- a second plurality of passages formed in said body means extending laterally of said first passages, each passage of said second plurality having a first end intersecting a different one of the axial passages of said first plurality,
- a recess formed in said body means adjacent the opposite end of each passageway of said second plurality,
- an adapter assembly for coupling a pipe to each passage of said second plurality of passages so that each of said passages can be coupled to an individual tuyere,
- said adapter assembly including a plurality of adapter members, each adapter member having a head portion disposed within one of said recesses and sealingly engaging said body means in communication with a different one of the passages of said second plurality of passages,
- a retainer for securing each of said adapters in its respective second passage, said retainer having a plurality of openings to permit said adapter members to extend therethrough,
- and means for coupling a pipe to a different one of said adapters.

* * * * *